United States Patent [19]
Arai et al.

[11] Patent Number: 5,480,630
[45] Date of Patent: Jan. 2, 1996

[54] PROCESS FOR PRODUCING FINE METAL OXIDE PARTICLES

[75] Inventors: Kunio Arai; Tadafumi Ajiri, both of Sendai, Japan

[73] Assignee: Nissan Chemical Industries Ltd., Tokyo, Japan

[21] Appl. No.: 714,225

[22] Filed: Jun. 12, 1991

[30] Foreign Application Priority Data

Jun. 15, 1990 [JP] Japan ................................. 2-157317

[51] Int. Cl.$^6$ ...................................................... C01F 7/02
[52] U.S. Cl. ........................................................ 423/625
[58] Field of Search ..................................... 423/625, 626, 423/123, 127, 141, 592, 593, 632

[56] References Cited

U.S. PATENT DOCUMENTS

| | | | |
|---|---|---|---|
| 1,413,754 | 4/1922 | Meijdell ................................. | 423/626 |
| 2,693,406 | 11/1954 | Wendell, Jr. et al. .................. | 423/625 |
| 3,207,578 | 9/1965 | Brown et al. .......................... | 423/626 |
| 3,366,446 | 1/1968 | Kelly et al. ............................ | 423/625 |
| 3,449,072 | 6/1969 | Freeman ................................ | 423/625 |
| 4,582,731 | 4/1986 | Smith ..................................... | 210/658 |
| 4,622,311 | 11/1986 | Wakui et al. ........................... | 423/111 |
| 4,734,451 | 3/1988 | Smith ..................................... | 210/656 |
| 5,037,577 | 8/1991 | Yamanoi et al. ....................... | 423/263 |

FOREIGN PATENT DOCUMENTS 653199  11/1962  Canada ................................. 423/625

OTHER PUBLICATIONS

Translation of "Manufacture of Metal Oxide . . . Supercritical Water", by T. Ajiri, et al., Kagaku Kogaku, vol. 55, No. 3, 1991, No Month, pp. 223–225.

Hattangadi, S., "How to Set a Periodic Table", Ind. Chemist, 9(5), May, 1988, pp. 20–23.

Grant, et al., Chemical Dictionary, 5th Ed., 1987, NO Month p. 598.

Kagaku Kokaku, vol. 55, No. 3 (1991), pp. 223–225, No Month. "Production of Fine Metal Oxide Particles by Reaction-crystallizing under Supercritical Conditions for Water," Adschiri, et al.

CRC Handbook of Chemistry and Physics, 52nd Edition 1971–72, No Month p. D-149.

Grant & Hackh's Chemical Dictionary, 5th Ed., 1987, No Month p. 61.

Alien Property Custodian, Ser. No. 389,254, Apr. 27, 1943, Wrigge, et al.

Primary Examiner—Steven Bos
Attorney, Agent, or Firm—Oblon, Spivak, McClelland, Maier & Neustadt

[57] ABSTRACT

Disclosed herein is a process for producing fine metal oxide particles comprising the step of heat-treating an aqueous solution of a metal salt at a temperature of not lower than 200° C. under a pressure of not less than 160 kg/cm$^2$ for 1 second to 1 hour so as to bring into the decomposition reaction of said metal salt.

4 Claims, 4 Drawing Sheets

FIG. 1  500 nm
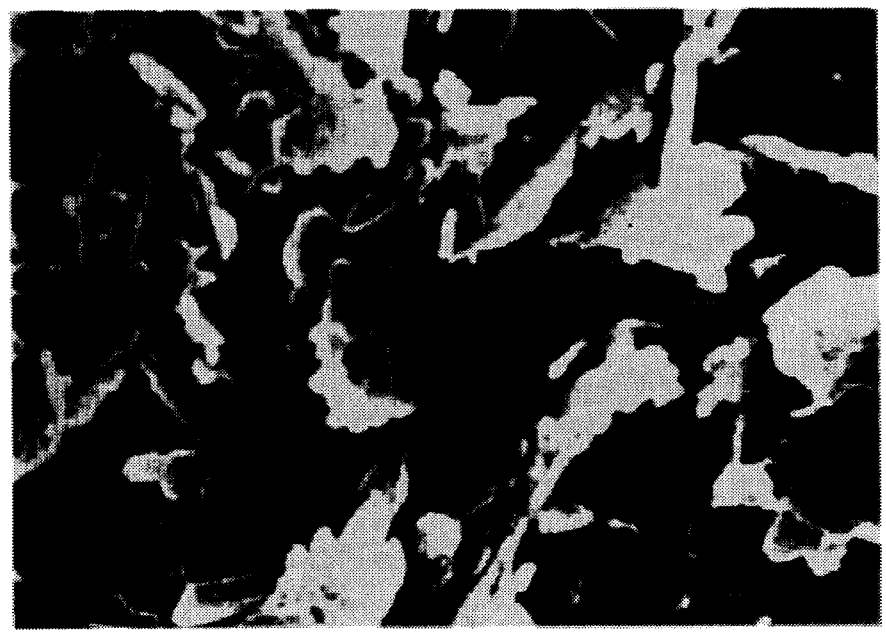
FIG. 2  500 nm

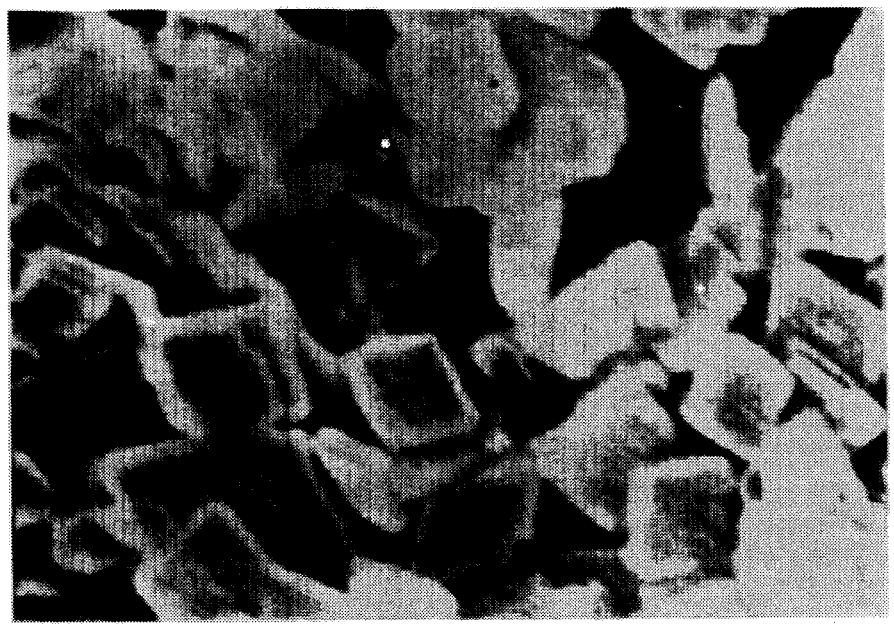
FIG. 3  |—100 nm—|
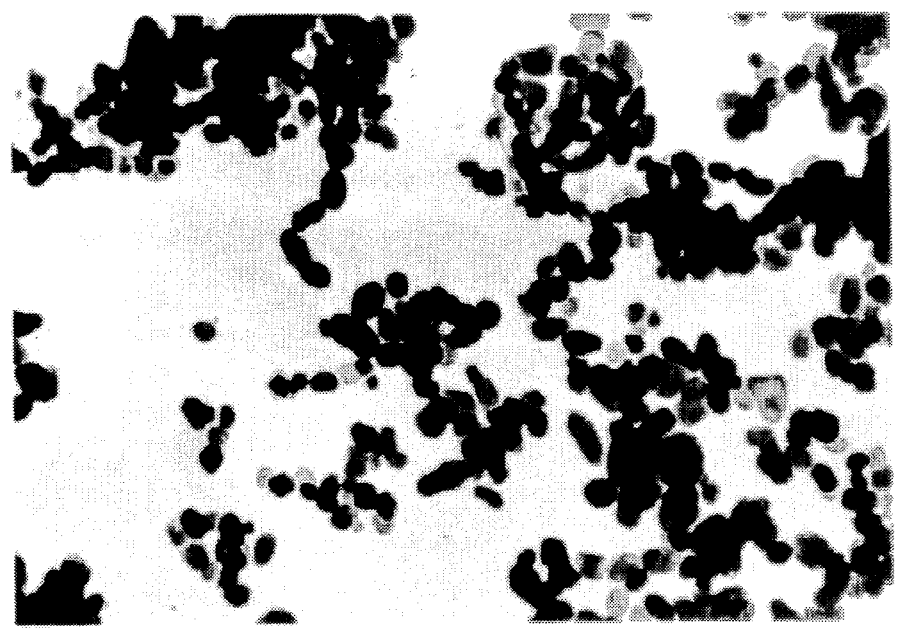
FIG. 4  |—100 nm—|

100 nm 100 nm

PROCESS FOR PRODUCING FINE METAL OXIDE PARTICLES

BACKGROUND OF THE INVENTION

The present invention relates to a process for producing fine metal oxide particles and, more particularly, to a process for producing fine metal oxide particles by heat-treating an aqueous solution of a metal salt under the subcritical to supercritical conditions for water.

The fine metal oxide particles are used in various fields, for example, as a material of ceramics, electronic devices, catalysts, cosmetics and coatings, reinforcing materials and fillers for modifiers, and various methods of producing the fine metal oxide particles are conventionally known.

The fine metal oxide particles used in the above fields are required to have a narrow particle size distribution width and the uniform shape, to be free from a dendrite or a crystal twinning, and to have few secondary agglomerates. The fine metal oxide particles are sometimes required to be uniformly agglomerated or amorphous to a great extent.

Such fine metal oxide particles are conventionally produced by coprecipitation method, heat hydrolysis method or autoclaving method. In the coprecipitation method, the particle size is greatly influenced by the temperature, concentration, charging ratio, charging rate, method of supplying the raw materials, and stirring, so that the particle diameter is not always uniform, resulting in a wide particle size distribution width. To prevent this, various means are taken such as the addition of various additives and the aging of the fine particles after the completion of the reaction.

In the heat hydrolysis method and the autoclaving method, an autoclave is used and a comparatively long reaction time or aging time such as 30 minutes to 48 hours is necessary.

That is, a process for producing the fine metal oxide particles with high productive efficiency has not been established.

As a result of various investigations by the present inventors, it has been found that by heat-treating an aqueous solution of a metal salt under the subcritical to supercritical conditions for water fine metal oxide particles having excellent characteristics such as narrow particle size distribution width and uniform particle shape can be obtained in a short time. The present invention has been achieved on the basis of this finding.

SUMMARY OF THE INVENTION

In an aspect of the present invention, there is provided a process for producing fine metal oxide particles comprising the step of heat-treating an aqueous solution of a metal salt under a pressure of not less than 160 kg/cm$^2$ and at a temperature of not lower than 200° C. to achieve a decomposition reaction of the metal salt.

BRIEF DESCRIPTION OF THE DRAWINGS

FIG. 1 is an electron micrograph of the particle structure of the boehmite obtained in Example 1;

FIG. 2 is an electron micrograph of the particle structure of the boehmite obtained in Example 3;

FIG. 3 is an electron micrograph of the particle structure of the boehmite obtained in Example 5;

FIG. 4 is an electron micrograph of the particle structure of the $\alpha$–$Fe_2O_3$ obtained in Example 7;

DESCRIPTION OF THE PREFERRED EMBODIMENTS

Figure 5:
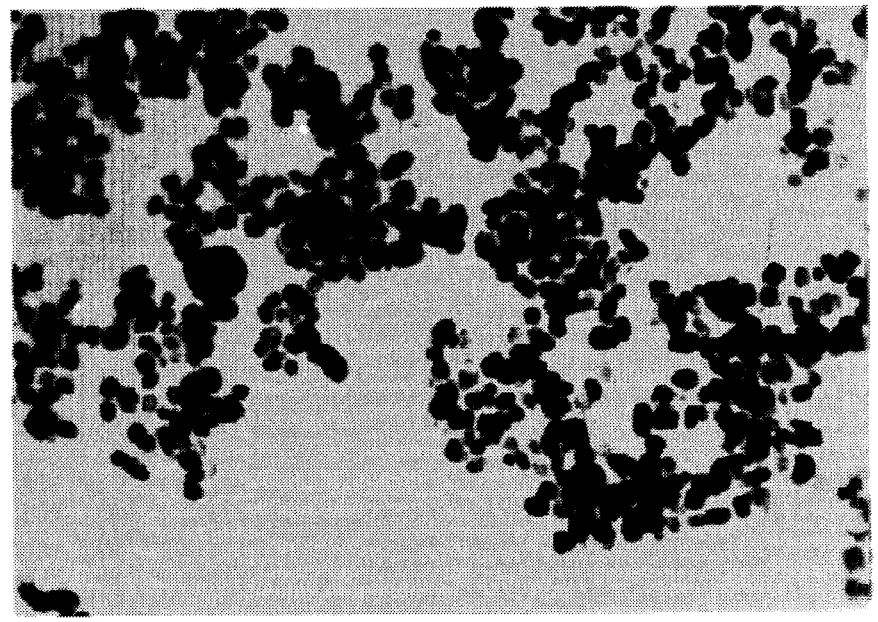
FIG. 5 is an electron micrograph of the particle structure of the $\alpha$–$Fe_2O_3$ obtained in Example 8.

The metal salt used in the present invention is not specified so long as it is water-soluble. For example, the metal salts of the metals of IB, IIA, IIB, IIIA, IIIB, IVA, IVB, VA, VB, VIB and VIIB groups and transition metals are usable. More concretely, inorganic acid salts such as nitrates, chlorides, sulfates, oxyhydrochlorides, phosphates, borates, sulfites, fluorides and oxyacid salts of Cu, Ba, Ca, Zn, Al, Y, Si, Sn, Zr, Ti, Sb, V, Cr, Mn, Fe, Co and Ni, and organic acid salts such as formates, acetates, citrates, oxalates and lactates of Cu, Ba, Ca, Zn, Al, Y, Si, Sn, Zr, Ti, Sb, V, Cr, Mn, Fe, Co and Ni may be exemplified. These metal salts may be used in the form of a mixture. The complexes of these metals are also usable. If the corrosion of the material of the apparatus or the like is taken into consideration, nitrates are preferable.

The concentration of the metal salt in the aqueous solution does not specified so long as it is dissolved, but the preferred metal salt concentration is 0.0001 to 1 mol/l.

A batch-type reaction process or a semi-batch-type reaction process is usable, but a continuous reaction process which charges the stock solution in a tubular reactor is preferable.

The reaction temperature and the reaction pressure is not less than 200° C. and not less than 160 kg/cm$^2$, respectively, which are the subcritical or supercritical conditions for water. The preferable reaction temperature is 300° to 500° C. and the preferable reaction pressure is 250 to 500 kg/cm$^2$. The reaction is especially preferably carried out under the supercritical conditions for water. The reaction time in the reactor is different depending upon the reaction conditions, but ordinarily 1 second to 1 hour, preferably 1 to 10 minutes.

The reaction product is collected by cooling it before the reaction pressure is reduced and (i) causing it to flow out to a constant-pressure system at a constant speed through a reducing valve or (ii) reducing directly the reaction pressure to the ordinary pressure.

In the present invention, an alkali and/or acidic aqueous solution may be added to an aqueous solution of a metal salt. As examples of the alkali may be exemplified ammonia, sodium hydroxide and potassium hydroxide, and as examples of the acid may be exemplified inorganic acids such as sulfuric acid, nitric acid, hydrochloric acid, carbonic acid and phosphoric acid, and organic acids such as formic acid, acetic acid, citric acid, oxalic acid and lactic acid.

In the present invention, a reducing gas such as hydrogen or an acidic gas such as oxygen may be introduced into an aqueous solution of a metal salt.

In order to separate the target fine metal oxide particles from the thus-obtained reaction product, a known method may be adopted. For example, the separation may be carried out by filtration, centrifugal separation, spray drying or ultrafiltration. It is also possible to directly obtain the dried fine metal oxide particles by reducing directly the reaction pressure to the ordinary pressure without cooling the reaction product.

Under the subcritical to supercritical conditions for water, the dissociation of water is enhanced to a great extent, and water aces on the aqueous solution of the metal salt as a stronger acid, thereby greatly facilitating the progress of the hydrolysis reaction or the metathetical reaction of the metal salt. In addition, since the physical properties such as the ionic product, dielectric constant, diffusion rate and thermal conductivity of a fluid greatly vary under the subcritical to supercritical conditions, it is easy to control the shape and the size of the fine metal oxide particles by controlling the reaction route and the reaction rate. It is possible to make the heat-transfer coefficient larger under the subcritical to supercritical conditions than in a gaseous phase and the diffusion coefficient much larger than in a liquid phase. It is, therefore, possible to make the reaction conditions in the reactor uniform in a wide range including a micro size at a molecular level, thereby suppressing the increase in the particle diameter distribution width and the scatter in the particle shape which are derived from the scatter in temperature gradient, pressure gradient or concentration.

As described above, according to the present invention, it is possible to finish the reaction in a short time and to further easily obtain the fine metal oxide particles having uniform particle diameter and shape by varying the reaction conditions such as the concentration of the raw material, addition of an alkali or an acid, introduction of a reducing gas or an acidic gas, the reaction temperature and the reaction pressure.

The shape of the fine particles of a metal oxide obtained by the process of the present invention is spindle-like, acicular, scale-like, hexagonal plate-like, square plate, ellipsoid, sphere, octahedron, or the like. The shape can be selected by varying the reaction conditions. Namely, the fine metal oxide particles obtained having a narrow particle size distribution width [for example, particle size distribution width=(0.7–1.3)×average particle size] in the particle size range of a major axial diameter of 100 to 2000 nm and a minor axial diameter of 50 to 1000 nm in the case of spindle-shaped particles; a major axial diameter of 100 to 1000 nm and a minor axial diameter of 20 to 200 nm in the case of acicular particles; a plane diameter of 100 to 2000 nm in the case of scale-like particles; a plate diameter of 100 to 1000 nm in the case of hexagonal plate-like particles; a side 50 to 1000 nm long in the case of square plate-like particles; a major axial diameter of 30 to 300 nm and a minor axial diameter of 20 to 200 nm in the case of ellipsoidal particles; a particle diameter of 20 to 500 nm in the case of spherical particles; and a particle diameter of 20 to 1000 nm in the case of octahedral particles.

Accordingly, the fine metal oxide particles produced by the process of the present invention are useful as a raw material of ceramics, electronic devices, catalysts, cosmetics and coatings, reinforcing materials and fillers for modifiers.

EXAMPLES

The present invention will be explained in more detail hereinunder with reference to the following examples.

In the examples, the reacting apparatuses A and B which will be described in the following were used.

Reaction Apparatus A

The suction portion of a pressure pump is introduced into an aqueous solution of the raw material through a pipe, and the discharging portion of the pump is connected to a stainless steel pipe 3.18 mm in outer diameter and 1.85 mm in inner diameter which is coiled to a length of 12 m. This reactor is placed in a heating furnace and a cooling portion is provided at the exit of the heating portion. A reducing valve is provided so that the reaction product is collected to a collector at a constant pressure.

Reaction Apparatus B

An apparatus similar to the reaction apparatus A except that the reactor in apparatus A is replaced by a stainless pipe having an outer diameter of 9.53 mm, an inner diameter of 6.23 mm, and a length of 400 mm.

Example 1

An aqueous solution of aluminum nitrate having a concentration of 0.01 mol/l was charged into the reaction apparatus A and brought into a decomposition reaction at a flow rate of 4 ml/min at a temperature of 350° C. under a pressure of 300 kg/cm$^2$. The reaction product obtained was a cloudy aqueous solution. From the X-ray analysis of the powder obtained by filtering and drying the reaction product, it was observed that 100% boehmite (AlOOH) had been produced. The uniformly spindle-shaped particles having a particle diameter of 1500×700 nm were observed in an electron micrograph, as shown in FIG. 1.

Examples 2 to 12

Figure 6:
FIG. 6 is an electron micrograph of the particle structure of the $Fe_3O_4$ obtained in Example 10.
Figure 7:
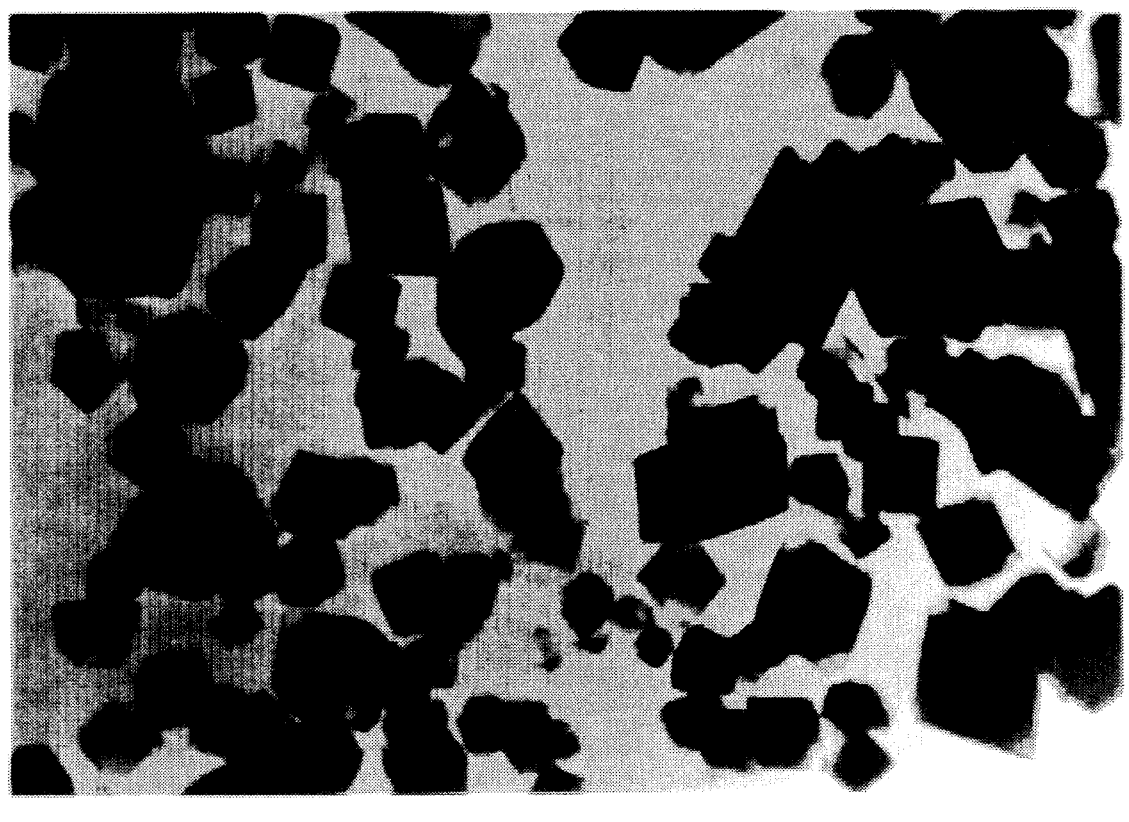
FIG. 7 is an electron micrograph of the particle structure of the $Fe_3O_4$ obtained in Example 11.

Aqueous solution of metal salts shown in Table 1 were brought into a decomposition reaction by using the reaction apparatus A or B under the conditions shown in Table 1 in the same way as in Example 1. The reaction products were analyzed with X-rays and the shapes of the particles were observed in electron micrographs. The typical examples of the electron micrograph are shown in FIGS. 2 to 7.

As shown in Table 1, boehmite particles varying in shape and size were obtained from aluminum nitrate, as shown in Table 1.

In the case of using an iron salt, various substances were produced under the influence of anions and cations. The lower the concentration of the raw material, the finer were the particles obtained.

TABLE 1

| | | Reaction Conditions | | | | | Reaction products | | |
|---|---|---|---|---|---|---|---|---|---|
| Example No. | Reaction Apparatus | Metal salt | Concentration (mol/l) | Temperature (°C.) | Pressure (kg/cm$^2$) | Flow rate (ml/min) | X-ray analysis | Particle shape | Particle size (nm) |
| 1 | A | Aluminium nitrate | 0.01 | 350 | 300 | 4 | Boehmite | Spindle-like | 1500 × 700 |
| 2 | A | Aluminium nitrate | 0.053 | 400 | 300 | 4 | Boehmite | Acicular | 700 × 100 |
| 3 | A | Aluminium | 0.01 | 300 | 400 | 4 | Boehmite | Scale-like | 200 |

TABLE 1-continued

| Example No. | Reaction Apparatus | Metal salt | Concentration (mol/l) | Temperature (°C.) | Pressure (kg/cm$^2$) | Flow rate (ml/min) | X-ray analysis | Particle shape | Particle size (nm) |
|---|---|---|---|---|---|---|---|---|---|
| 4 | A | Aluminium nitrate | 0.01 | 400 | 400 | 4 | Boehmite | Hexagonal plate-like | 300 |
| 5 | A | Aluminium nitrate | 0.002 | 400 | 350 | 4 | Boehmite | Square plate-like | 200 |
| 6 | A | Aluminium nitrate | 0.0004 | 400 | 350 | 4 | Boehmite | Square plate-like | 100 |
| 7 | B | Fe(NO)$_3$ | 0.1 | 400 | 350 | 4 | α-Fe$_2$O$_3$ | Ellipsoidal | 50–100 |
| 8 | B | " | 0.02 | 400 | 350 | 4 | α-Fe$_2$O$_3$ | " | 30–60 |
| 9 | A | Fe$_2$(SO$_4$)$_3$ | 0.01 | 400 | 400 | 4 | α-Fe$_2$O$_3$ +Fe$_3$O$_4$ | Spherical | 20 |
| 10 | B | Ferric ammonium citrate | 0.02 | 400 | 350 | 6 | Fe$_3$O$_4$ | Ellipsoidal | 20–50 |
| 11 | B | Cobalt nitrate | 0.02 | 400 | 350 | 5 | Co$_3$O$_4$ | Octahedral | 40–250 |
| 12 | B | Nickel nitrate | 0.02 | 400 | 350 | 6 | NiO | Acicular | 100 × 400 |

What is claimed is:

1. A process for producing fine aluminum oxide particles having particle size of 20 to 2000 nm comprising the steps of heat-treating an aqueous solution of a water-soluble metal salt of aluminum at a temperature of not lower than 200° C. at a pressure of 250 to 500 kg/cm$^2$ for 1 second to 10 minutes to achieve a decomposition reaction of said metal salt to form fine aluminum oxide particles, wherein said aqueous solution of said metal salt is continuously supplied to a tubular reactor in such a manner as to remain in a reaction zone of the tubular reactor at a temperature of not lower than 200° C. and a pressure of 250 to 500 kg/cm$^2$ for 1 second to 10 minutes, and separating said fine aluminum oxide particles.

2. A process according to claim 1, wherein the temperature is from 300° to 500° C.

3. A process according to claim 1, wherein an alkali or acidic aqueous solution is added to said aqueous solution of said aluminum salt.

4. A process according to claim 1, wherein a reducing gas comprising hydrogen or an acidic gas comprising oxygen is introduced into said aqueous solution of said aluminum salt.

* * * * *